April 30, 1963 S. MITTY ET AL 3,087,740
CORRUGATED SHOPPING CART AND PARTS
Filed Jan. 23, 1961 4 Sheets-Sheet 1
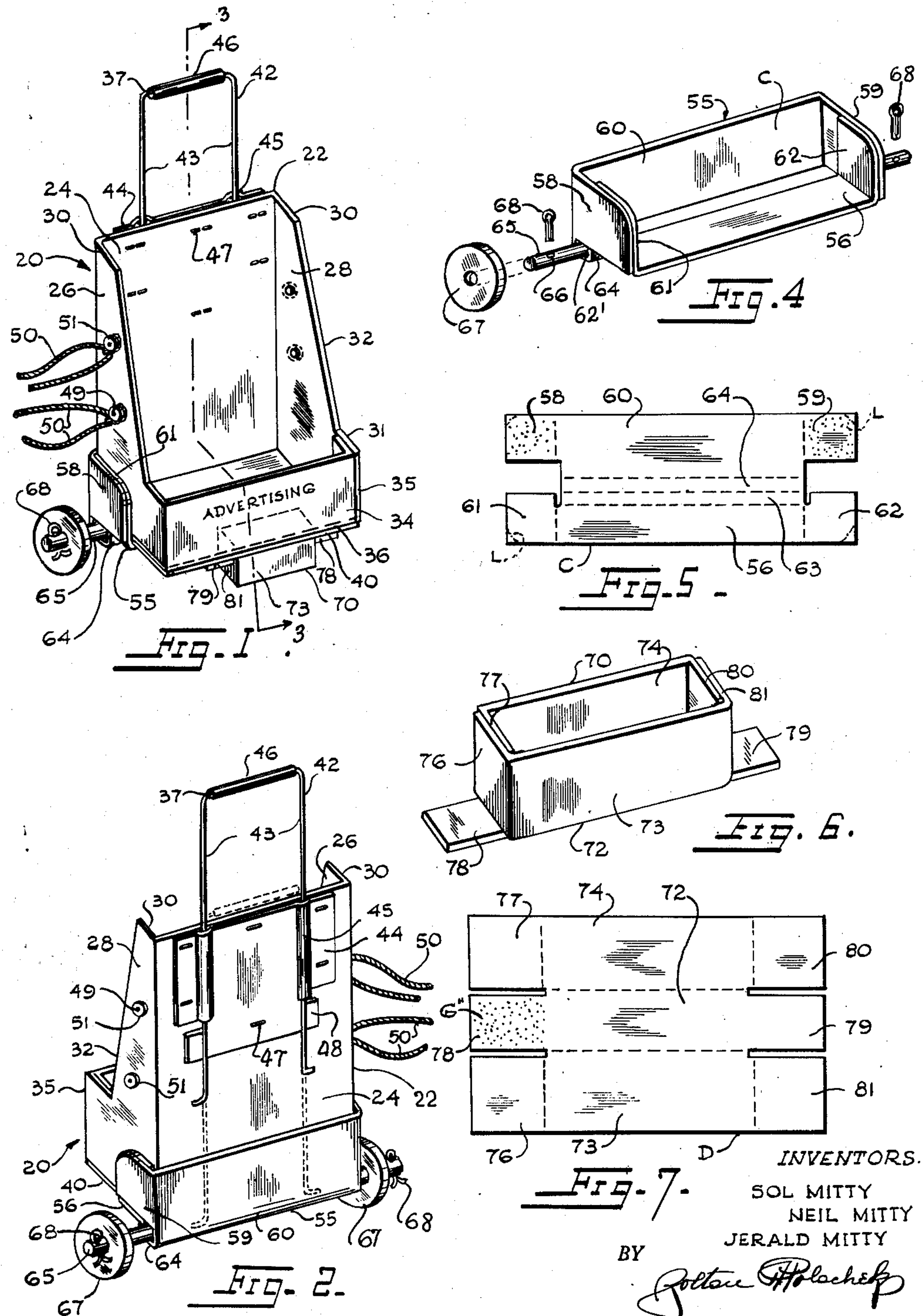
INVENTORS.
SOL MITTY
NEIL MITTY
JERALD MITTY
BY
ATTORNEY.

CORRUGATED SHOPPING CART AND PARTS

Filed Jan. 23, 1961 4 Sheets-Sheet 2

INVENTORS
SOL MITTY
NEIL MITTY
JERALD MITTY
BY
[signature]
ATTORNEY.

CORRUGATED SHOPPING CART AND PARTS
Filed Jan. 23, 1961 4 Sheets-Sheet 3
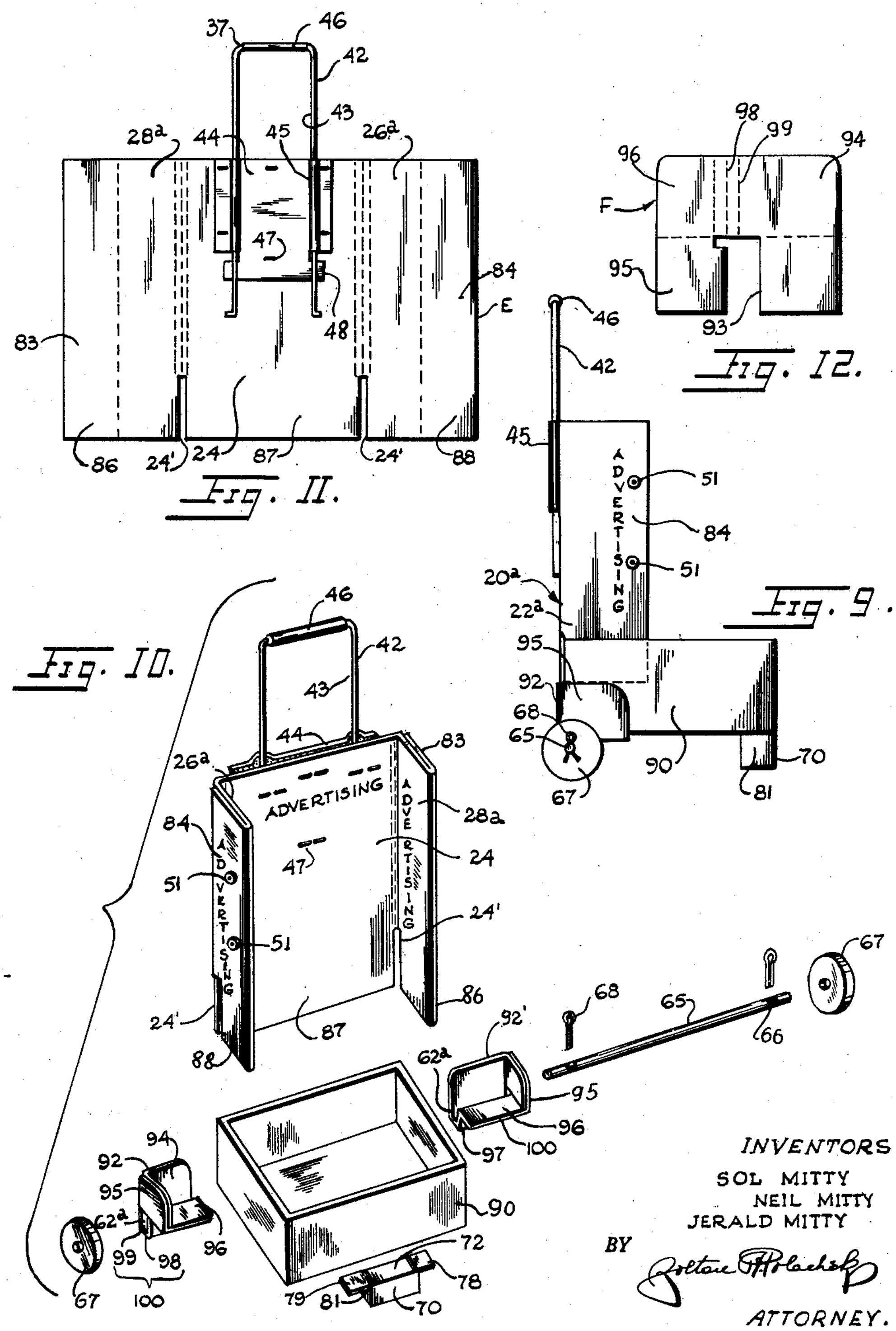
INVENTORS
SOL MITTY
NEIL MITTY
JERALD MITTY
BY
ATTORNEY.

CORRUGATED SHOPPING CART AND PARTS
Filed Jan. 23, 1961 4 Sheets-Sheet 4
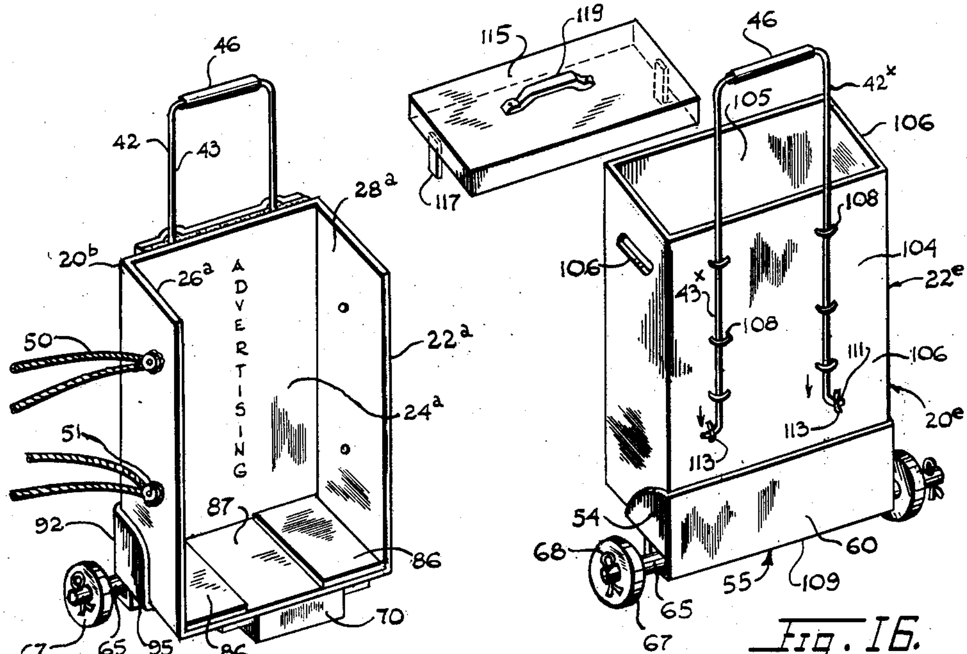
FIG. 13.
FIG. 16.
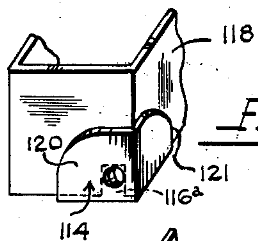
FIG. 19.
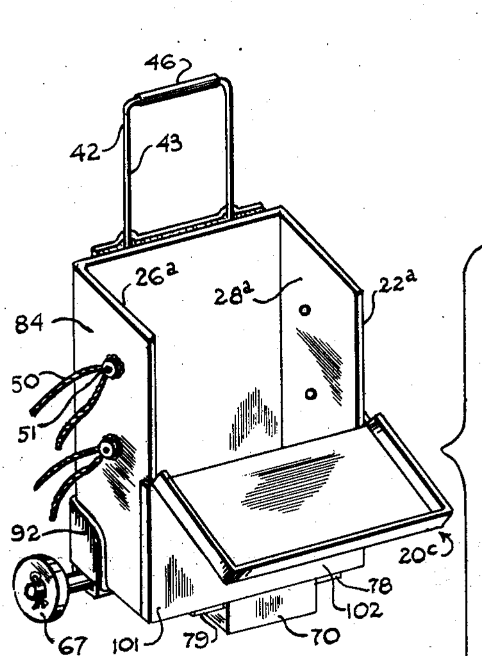
FIG. 14.
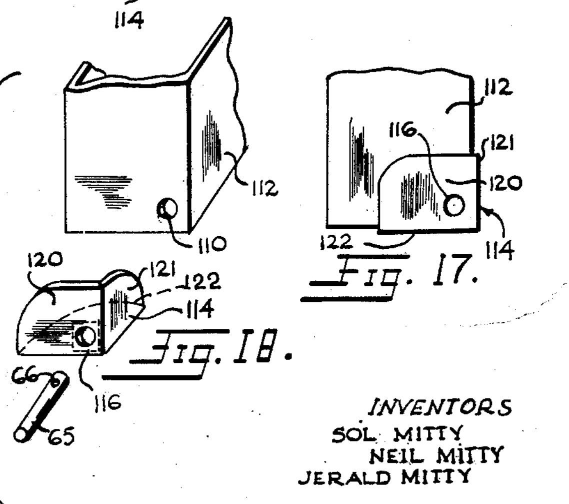
FIG. 17.
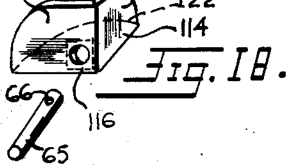
FIG. 18.
INVENTORS
SOL MITTY
NEIL MITTY
JERALD MITTY
BY Zoltan H. Polachek
ATTORNEY.

United States Patent Office 3,087,740
Patented Apr. 30, 1963

3,087,740
CORRUGATED SHOPPING CART AND PARTS
Sol Mitty, Neil Mitty, and Jerald Mitty, all of 144—45 78th Ave., Flushing, N.Y.
Filed Jan. 23, 1961, Ser. No. 84,067
2 Claims. (Cl. 280—47.26)

This invention concerns an improved shopping cart.

The invention is directed particularly at an expendable cart adapted for just one or several shopping trips. The cart may be formed from a blank sheet of corrugated paperboard and provided with a wheel assembly and handle. In another form of the invention, conventional cartons can be used as parts of the carts. The body of the cart can be printed with suitable advertising subject matter at the time of assembly or can be marked with advertising at the market where it will be sold or given free as a sales premium. The shopping cart can be reused for shopping, carting laundry, and other household purposes. Particular features of the invention are the economical construction of the several parts, ease of assembly, utility for advertising purposes, adaptability for carting bulky merchandise irregular in size and heavy in weight, and the like.

It is therefore a principal object of the invention to provide a shopping cart with a body fabricated from corrugated paperboard.

Another object is to provide a corrugated paperboard shopping cart including a body, with attached handle and wheel assemblies.

Still another object is to provide a shopping cart body which can be assembled from a cardboard blank, the cart blank being so shaped that two carts can be derived from a rectangular sheet of cardboard without waste, the two assembled blanks being complementary in form to constitute together a closed, rectangular container.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a front and side perspective view of a shopping cart embodying the invention.

FIG. 2 is a rear and side perspective view of the shopping cart of FIG. 1.

FIG. 4 is an exploded perspective view of a wheel assembly employed in the cart.

FIG. 5 is a plan view of a cardboard blank which can be assembled to form the body of the wheel assembly.

FIG. 6 is an inverted perspective view of an inverted base rest employed in the cart.

FIG. 7 is a plan view of a cardboard blank from which the base rest is assembled.

FIG. 9 is a side elevational view of another shopping cart according to the invention.

FIG. 10 is an exploded perspective view of the cart of FIG. 9.

FIG. 11 is a plan view of a blank cardboard sheet from which the body of the cart of FIGS. 9 and 10 is formed, a handle being shown applied thereto.

FIG. 12 is a plan view of a blank from which a wheel holder can be assembled.

FIG. 13 is a perspective view of still another shopping cart assembly according to the invention.

FIG. 14 is a perspective view of a further shopping cart body with an openable front.

FIG. 16 is an exploded perspective view of yet another shopping cart.

FIG. 17 is a side elevational view of portions of another shopping cart assembly.

FIG. 18 is an exploded perspective view of parts of the assembly of FIG. 17.

FIG. 19 is a perspective view of a portion of another shopping cart body.

Figure 3:
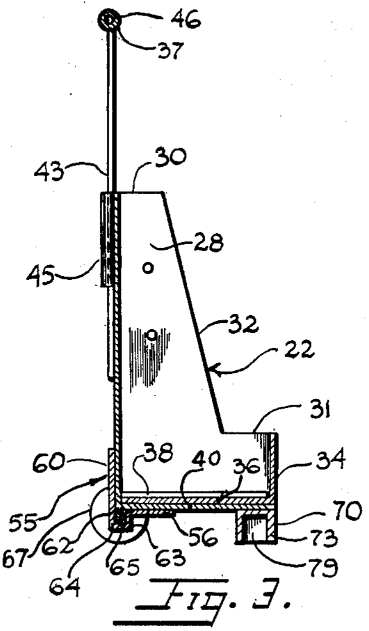
FIG. 3 is a vertical sectional view taken on line 3—3 of FIG. 1.

In FIGS. 1–3, there is shown a shopping cart 20 having a body 22 which can be formed from a flat blank sheet of corrugated board or cardboard. The cart has a rectangular back panel 24 and two side panels 26, 28. The side panels extend outwardly at their upper edges 30 about a third of the width of the body 22. Edges 32 extend angularly downward and outward from the forward ends of edges 30 to edges 31 at the top of tray 35 formed at the bottom of the cart body. This tray is rectangular in horizontal cross section and is defined by a narrow front rectangular panel 34, side panels 26, 28, back panel 24 and a rectangular bottom panel 36. Panel 36 is folded under and back and supports two horizontal flaps 38, 39 folded laterally inwardly from the side panels. A reinforcing bottom panel 40 underlays the flaps 38, 39. Panel 40 is formed by bending under and forwardly a rectangular section of the back panel 24. The several overlaying panels may be glued or stapled together. An advertising display 25 may be applied on the front, side and rear panels of the cart.

An inverted U-shaped wire handle 42 may be slidably mounted on the back panel. The sides 43 of the handle are held by a generally rectangular cardboard plate 44 formed with grooves defining parallel channels 45 at the back of the cart. A cylindrical paper tube 46 reinforces the bight 37 of the handle and provides a good hand grip. Staples 47 hold the plate on the rear panel 24. Plate 44 may be formed with slotted wings 48 to serve as friction grippers for the sides of the handle, the slots constituting stop gaps. The handle may be lowered to the dotted line position shown in FIG. 2. Tabs 51 may be secured by eyelets 49 or staples to the side panels for engaging strings 50. The strings may be used to tie over bulky articles such as sacks of potatoes, fruits and the like. A narrow folded strip 41 may be provided at the vertical edge of panel 24. This strip can be glued to the side panel 28.

Figure 8:
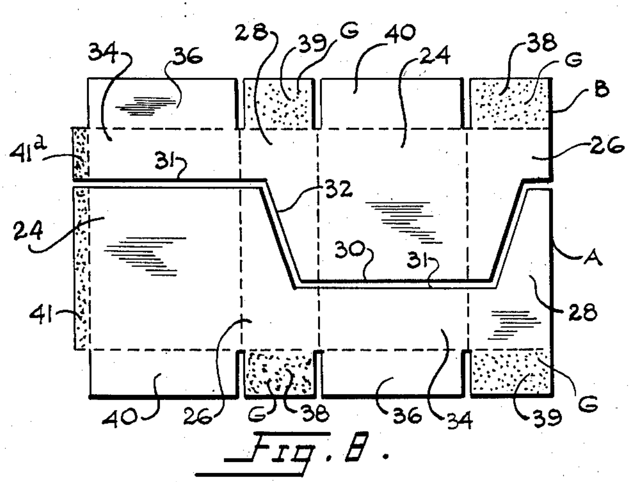
FIG. 8 is a plan view on a reduced scale of a cardboard sheet cut to form two blanks for shopping cart bodies.

FIG. 8 shows how two blanks A and B for two similar cart bodies can be cut from a single rectangular piece of corrugated paperboard. The panels of the blanks are numbered to correspond with the panels of the cart body 22 in FIGS. 1–3. Adhesive such as glue G may be applied to the several flaps 36, 38, 39 and/or 40 to secure these bottom flaps together. In FIGS. 1, 2, and 3, there is shown a full rectangular box divided into two open cart bodies or containers made from the blanks A and B. Instead of strip 41, blank B has a short, narrow strip 41[a] at the edge of panel 34 which would secure to the free edge of panel 26 by means of an adhesive, staples or other fastening means.

A wheel assembly 55 is provided for the assembled cart body. This wheel assembly is shown in FIGS. 1–4 and the blank C from which the body of the wheel assembly may be formed is shown in FIG. 5. The wheel assembly has the form of a shelf 56 with upstanding side walls 58, 59 integral with a rear wall 60. Upstanding flaps 61, 62 are formed at the ends of the shelf 56 and may be secured to the inner sides of walls 58, 59 by glue or other fastening means. A trough 62′ is formed at the bottom rear side of the wheel assembly, by extending rear wall 60 below the level of horizontal shelf 56 and then bending the extension forwardly and upwardly to form two narrow strip-like panel sections 63, 64 which define the trough. A wooden dowel rod 65 can be inserted through the assembly and seated in the trough 62'. Outer ends of the rod may be provided with holes 66 to receive cotter pins 68. Wheels 67 can be mounted on the ends of the rod projecting outwardly beyond the side walls 58, 59 and held thereon by the cotter pins. The corners of the walls 58, 59 and flaps 61, 62 may be squared or may be rounded as indicated by dotted lines L on the blank C in FIG. 5. Adhesive may be applied to the forward and upper sides of wall 60 and shelf 56 for securing the wheel assembly to the rear panel 24 and bottom panel 40 of the cart body 22. FIG. 5 shows how a substantially rectangular piece of corrugated paperboard can be cut and folded to form the several walls and flaps of the body of the wheel assembly.

In FIGS. 1, 3, and 6 there is shown a base or footrest 70 for the cart. This base can be formed from a rectangular piece of corrugated paperboard D as shown in FIG. 7. The base is formed as a box with open bottom. It has a flat, rectangular top panel 72 formed with end wings 78 and 79 for gluing or stapling to the bottom of the cart body. Opposing front and rear side panels 73 and 74, and overlapping end flaps 76, 77, 80, 81 reinforce the box structure. These flaps can be glued or stapled together by glue G'' applied thereto. The base rest holds the cart in a vertical position when the body 22 is mounted on the wheel assembly as shown in FIGS. 1–3. The base or footrest may also be constituted by a wooden block.

In FIGS. 9–12 is shown another modified cart construction 20$^a$. The body 22$^a$ of a cart 20$^a$ can be formed from the flat rectangular corrugated blank E shown in FIG. 11. Parts corresponding to those of cart body 22 are identically numbered. This cart body is an open front container with panels 83, 84 folded back and alongside of panels 26$^a$, 28$^a$. The bottom tray provided in body 22 is omitted. In FIGS. 9 and 10 the bottom flaps 86, 87, 88 of the cart body are left unfolded and slots 24' are formed at the junctures between flaps 86 and 87 and between flaps 87 and 88 and the body is inserted into a conventional open top rectangular carton 90. Base member 70 is provided underneath the carton. A modified wheel reinforcement assembly is provided by two corner wheel supports 92, 92' which can be formed from a flat corrugated blank board F shown in FIG. 12 and attached to carton 90, or may be formed of metal or plastic. This blank is formed with an L-shaped cut 93 and is foldable along the dotted lines shown in FIG. 12 to provide rear wall 94, end wall 95 and double bottom walls 96, 97. A trough 62$^a$ is formed at the bottom of wall 94 by panel sections 98, 99. The free edge of wall 96 can be bent to form a strip 100 which will lock over the free edge of wall 97.

Rod 65 will be engaged in the two wheel supports 92, 92', one wheel support being a reverse form of the other, but both being made from the same form of blank F. Wheels 67 will be held on the ends of the rod by cotter pins 68, in holes 66.

Referring to the modification shown in FIG. 13, a half a cart body 22$^a$ is shown comprising a rear panel 24$^a$ and side panels 26$^a$ and 28$^a$, a bottom panel 87 and showing flaps 86 and 88 on the side panels 28$^a$ and 26$^a$, respectively, overlapping the bottom panel 87. A carton structure such as carton 90 is omitted, and the base support 70$^a$ is secured to the bottom of the bottom panel 87. In all other respects, it is the same as the form of FIG. 1.

The modified form of cart 20$^c$ shown in FIG. 14 is similar to the form shown in FIG. 13 except that the front of the body 22$^a$ is closed by a fixed panel section 101 and by a foldable hinged panel section 102.

Figure 15:
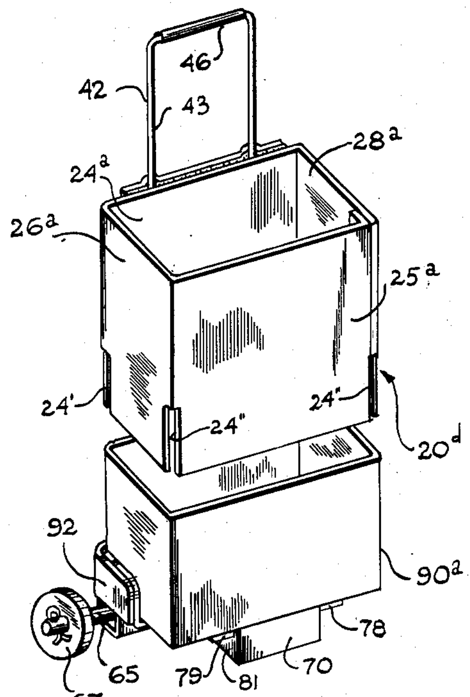
FIG. 15 is a perspective view of a cart body embodying a still further modified form of the invention.

The modified form of cart 20$^d$ shown in FIG. 15 differs from the form of cart 20$^a$ shown in FIGS. 9–12 in that the front of the cart is closed by means of a front panel 25$^a$ formed integrally with side panels 26$^a$ and 28$^a$ and rear panel 24$^a$. Furthermore, elongated slots 24'' are formed at the bottom of the junctures between the front panel 25$^a$ and side panels 26$^a$ and 28$^a$ to facilitate mounting of the cart body on top of carton 90$^a$.

In the modification shown in FIG. 16, the cart 20$^e$ is formed with a one-piece cart body 22$^e$ having rear panel 104, front panel 105 and side panels 106, and bottom panel 109.

A wheel assembly similar to wheel assembly 55 is supplied to the bottom of the cart body.

In this form, however, the handle 42$^x$ is fastened on the rear surface of rear panel 104 by means of spaced brads or staples 108 and the bottom free ends of the sides 43$^x$ of the handle are bent as indicated at 111 and are secured against displacement by means of vertically disposed staples 113.

Any suitable cover 115 may be provided for closing the open top end of the cart body. The cover may also be provided with spring or other retaining fingers 117 depending from the ends thereof for holding the cover on the cart body. A handle 119 secured to the center of the cover serves to manipulate the cover.

FIGS. 17 and 18 show an alternative corner construction for a cart body. A hole 110 is formed in the corner of a carton 112. A corner reinforcement 114 made of metal, plastic or cardboard, and having three mutually perpendicular sides 120–122 is secured to the corner of the carton. The reinforcement has a hole 116 which registers with hole 110. Rod 65 will be inserted through two such reinforced corners. The hole in the carton may be rectangular such as the hole 116$^a$ shown in the modified carton of FIG. 19. The corner reinforcement 114 will be secured by glue or the like to carton 118 in the same manner as to carton 112.

In all forms of the invention, the cart is characterized by the economy in materials and labor required to fabricate the cart. It may be provided for one-time use or for several shopping trips. The cart will also have general household utility.

While we have illustrated and described the preferred embodiments of our invention, it is to be understood that we do not limit ourselves to the precise constructions herein disclosed and that various changes and modifications may be made within the scope of the invention as defined in the appended claims.

Having thus described our invention, what we claim as new, and desire to secure by United States Letters Patent is:

1. A shopping cart, comprising a folded corrugated paperboard body forming a container for sundry articles, said body having a back panel, side panels and overlapping flaps defining a bottom for the container; a wheel assembly secured to the bottom of the container at the rear thereof, said assembly comprising a folded corrugated paperboard member with a horizontal shelf, upstanding rear wall and upstanding side walls, said rear wall being formed with a plurality of folded sections defining a trough extending below said shelf, a rod extending through the trough, a pair of wheels on the ends of the rod, cotter pins holding the wheels on the rod, an inverted U-shaped wire handle having depending sides slidably secured to the back panel for collapsing the handle; a base rest mounted at the bottom of the container, said base rest being formed as a folded corrugated paperboard box with open bottom and closed top, the top of the box being secured to the bottom of the container at the front thereof to hold the cart upright, said body being formed with an additional front panel and bottom flap, said bottom flap being juxtaposed to the first-named overlapped flaps, whereby a rectangular tray is formed at the bottom of the container.

2. A shopping cart, comprising a folded corrugated paperboard body forming a container for sundry articles, said body having a back panel, side panels and overlapping flaps defining a bottom for the container; a wheel assembly secured to the bottom of the container at the rear thereof, said assembly comprising a folded corrugated paperboard member with a horizontal shelf, upstanding rear wall and upstanding side walls, said rear wall being formed with a plurality of folded sections defining a trough extending below said shelf, a rod extending through the trough, a pair of wheels on the ends of the rod, cotter pins holding the wheels on the rod, an inverted U-shaped wire handle having depending sides slidably secured to the back panel for collapsing the handle; a base rest mounted at the bottom of the container, said base rest being formed as a folded corrugated paperboard box with open bottom and closed top, the top of the box being secured to the bottom of the container at the front thereof to hold the cart upright, said body being formed with an additional front panel and bottom flap, said bottom flap being juxtaposed to the first-named overlapped flaps, whereby a rectangular tray is formed at the bottom of the container, secured to the side panels and strings secured to the tabs for securing bulky articles in the body of the cart.

References Cited in the file of this patent

UNITED STATES PATENTS

| | | |
|---|---|---|
| 2,146,106 | Biszantz | Feb. 7, 1939 |
| 2,168,240 | Roberts | Aug. 1, 1939 |
| 2,482,848 | Grant | Sept. 27, 1949 |
| 2,868,557 | Klipp et al. | Jan. 13, 1959 |
| 2,925,283 | Stilger | Feb. 16, 1960 |